(12) United States Patent
Ristock et al.

(10) Patent No.: US 10,114,886 B2
(45) Date of Patent: Oct. 30, 2018

(54) METHOD FOR INTERACTING WITH A GROUP OF INDIVIDUALS AS A SINGLE CONTACT

(71) Applicant: GENESYS TELECOMMUNICATIONS LABORATORIES, INC., Daly City, CA (US)

(72) Inventors: Herbert Willi Artur Ristock, Walnut Creek, CA (US); Vladimir Mezhibovsky, San Francisco, CA (US)

( * ) Notice: Subject to any disclaimer, the term of this patent is extended or adjusted under 35 U.S.C. 154(b) by 0 days.

(21) Appl. No.: 15/701,154

(22) Filed: Sep. 11, 2017

(65) Prior Publication Data

US 2017/0371951 A1 Dec. 28, 2017

Related U.S. Application Data

(63) Continuation of application No. 14/449,129, filed on Jul. 31, 2014, now Pat. No. 9,760,621, which is a continuation of application No. 13/270,749, filed on Oct. 11, 2011, now Pat. No. 8,830,876.

(51) Int. Cl.
| | |
|---|---|
| *H04L 12/16* | (2006.01) |
| *G06F 17/30* | (2006.01) |
| *H04M 3/42* | (2006.01) |
| *H04M 3/51* | (2006.01) |
| *H04L 29/06* | (2006.01) |

(52) U.S. Cl.
CPC ...... *G06F 17/30598* (2013.01); *H04L 65/403* (2013.01); *H04M 3/42127* (2013.01); *H04M 3/51* (2013.01); *H04M 2203/402* (2013.01)

(58) Field of Classification Search
CPC ...................................................... G06Q 30/02
USPC ........................................................ 370/260
See application file for complete search history.

(56) References Cited

U.S. PATENT DOCUMENTS

| | | | |
|---|---|---|---|
| 7,953,859 B1 | 5/2011 | Kiefhaber et al. | |
| 8,589,328 B1* | 11/2013 | Sharma | G06Q 10/063 434/236 |
| 8,830,876 B2 | 9/2014 | Ristock et al. | |
| 8,990,105 B1* | 3/2015 | Shatkin-Margolis | G06Q 30/02 705/14.25 |
| 2006/0029206 A1 | 2/2006 | Anisimov et al. | |
| 2006/0173985 A1 | 8/2006 | Moore | |
| 2007/0173324 A1* | 7/2007 | Multerer | A63F 13/12 463/42 |

(Continued)

OTHER PUBLICATIONS

About GroupMe, GroupMe company website, accessed Apr. 11, 2014, 2 pages. <https://groupme.com/about>.

(Continued)

*Primary Examiner* — Shripal Khajuria (57) ABSTRACT

A method for establishing a group of individuals as a single contact entity eligible for contact services within a contact center includes the steps (a) identifying a group and each group member according to existing group rules and member profiles; (b) identifying and quantifying the unifying aspects of the members in the group; (c) aggregating the contact information for each group member relative to communications channels common to the group members and to the contact center; and (d) establishing one or more temporary and or permanent group channels between the contact center and the group members.

20 Claims, 5 Drawing Sheets

(56) References Cited

U.S. PATENT DOCUMENTS

| | | | |
|---|---|---|---|
| 2007/0288514 A1* | 12/2007 | Reitter | G06F 17/30864 |
| 2008/0033815 A1* | 2/2008 | Choi | G06Q 30/00 |
| | | | 705/14.54 |
| 2008/0071917 A1 | 3/2008 | Petrovykh | |
| 2008/0091723 A1 | 4/2008 | Zuckerberg et al. | |
| 2008/0162701 A1 | 7/2008 | Ryabchun et al. | |
| 2009/0030927 A1 | 1/2009 | Cases et al. | |
| 2009/0168990 A1 | 7/2009 | Makagon et al. | |
| 2011/0238472 A1 | 9/2011 | Sunkada | |
| 2013/0089007 A1 | 4/2013 | Ristock | |

OTHER PUBLICATIONS

AboutPhoneTree, PhoneTree company website, accessed Apr. 11, 2014, 1 page. <http://www.phonetree.com/AboutUs.aspx>.

International Search Report and Written Opinion for International Application No. PCT/US2012/59817, dated Dec. 21, 2012, 7 pages.

VoiceWaveProducts, PhoneTree company website, accessed Apr. 11, 2014, 1 page. <http://www.phonetree.com/Products/VoiceWaveProducts.aspx>.

* cited by examiner

METHOD FOR INTERACTING WITH A GROUP OF INDIVIDUALS AS A SINGLE CONTACT

CROSS-REFERENCE TO RELATED APPLICATIONS

This application is a continuation of U.S. patent application Ser. No. 14/449,129, filed on Jul. 31, 2014, now U.S. Pat. No. 9,760,621, which is a continuation of U.S. patent application Ser. No. 13/270,749, filed on Oct. 11, 2011, now U.S. Pat. No. 8,830,876, the contents of all of which are incorporated herein by reference.

BACKGROUND OF THE INVENTION

1. Field of the Invention

The present invention is in the field of telephony including Internet protocol network telephony (IPNT), a subset of data network telephony (DNT), and pertains particularly to methods and apparatus for managing multiple contacts assembled as a group, forming a single contact entity within a contact center.

2. Discussion of the State of the Art

In the art of telephony communications, contact centers exist to handle sales, service and technical support for businesses offering products and or services to their customers and potential customers. Communications methods typically in place in state-of-art contact centers focus on individual contacts and manage those contacts individually from the standpoint of incoming and proactive interaction campaigns.

At the time of the writing of this specification, contact center client management solutions only treat individual customers as single contacts within the center. The customers can be assigned levels (gold, silver, etc.) reflecting their importance to the business, or associated with service domains (mortgage, credit cards, etc.), but finally each customer is treated individually.

There is currently no contact center solution to treat group relationship management within a contact center. More recently, applications such as PhoneTree™ and GroupMe™ have been developed for reaching established groups of individuals, however these solutions are limited to enabling communications to individual members of the groups identified.

Therefore, what is clearly needed is a method for establishing a group of individuals as a single managed contact eligible for contact services within a contact center. A method such as this would enable more efficient sales and service using fewer contact center resources.

SUMMARY OF THE INVENTION

The problem stated above is that manageable group-to-business (G2B) relationships are desirable for a contact center, but many of the conventional means (applications) for reaching established groups of individuals, such as PhoneTree™ and GroupMe™ are limited to enabling communications to individual members of the group.

The inventors therefore considered functional components of an Internet protocol (IP) enhanced call center, looking for elements that exhibit interoperability that could potentially be harnessed to provide group management as a single contact in a contact center but in a manner that would not create latency, or traffic overload conditions. Every contact center is propelled by potential new clients, one by-product of which is an abundance of transactions for products and or services. Most such contact centers employ servers and software to conduct the call center traffic from an incoming switch or server to a system or human-operated interface to handle the interactions, and servers with software are typically a part of such apparatus.

The present inventor realized in an inventive moment that if, at the point of discovery, groups of individuals could be managed as a single contact within the contact center, significant increase in proactive and incoming business might result. The inventor therefore constructed a unique service for managing customers that allowed groups of potential customers to be handled within the contact center as a single contact entity that may be cultivated to potentially add new customers to the customer bases of the contact center. A significant increase in new business results, with no impediment to call-center efficiency or capacity created.

Accordingly, in one aspect of the present invention, a method for establishing a group of individuals as a single contact entity eligible for contact services within a contact center is provided and includes the steps (a) identifying a group and each group member according to existing group rules and member profiles; (b) identifying and quantifying the unifying aspects of the members in the group; (c) aggregating the contact information for each group member relative to communications channels common to the group members and to the contact center; and (d) establishing one or more temporary and or permanent group channels between the contact center and the group members.

In one aspect of the method, the group is an established, but evolving social networking group. In one aspect, the unifying aspects of the group members are business domain related. In one aspect, the unifying aspects of the group members are product related. In one aspect, the unifying aspects of the group members are service related. In one aspect, the unifying aspects of the group members are skills related.

In one aspect, the contact information includes telephone number, email address, and, or instant message address. In one aspect, the group is a temporary group established on a reoccurring basis. In one aspect, the group is a temporary group established once for a specific scheduled function or event. In one aspect, the group channels include a Web channel, a chat room, and, or a conference bridge.

According to one embodiment of the present invention, a system is provided for establishing a group of individuals as a single contact entity eligible for contact services within a contact center, comprising an Internet-connected server and software executing on the server from a non-transitory physical medium, the software providing a first function for identifying a group of individuals and each group member according to existing group rules and member profiles; a second function for identifying and quantifying the unifying aspects of the members in the identified group; a third function for aggregating the contact information for each group member relative to communications channels common to the group members and to the contact center; and a fourth function for establishing one or more temporary and or permanent group channels between the contact center and the group members.

In one embodiment, the group is an established, but evolving social networking group. In one embodiment, the unifying aspects of the group members are business domain related. In another embodiment, the unifying aspects of the group members are product related. In another embodiment, the unifying aspects of the group members are service related. In another embodiment, the unifying aspects of the group members are skills related. In one embodiment, the contact information includes telephone number, email address, and, or instant message address.

In one embodiment, the group is a temporary group established on a reoccurring basis. In another embodiment, the group is a temporary group established once for a specific scheduled function or event. In one embodiment, the group channels include a Web channel, a chat room, and, or a conference bridge.

DETAILED DESCRIPTION

The inventors provide system and method for contact center operations wherein groups of individuals and perhaps other entities are treated as a single entity in contact center operations. The present invention is described in enabling detail using the following examples, which may describe more than one relevant embodiment falling within the scope of the present invention.

Figure 1:
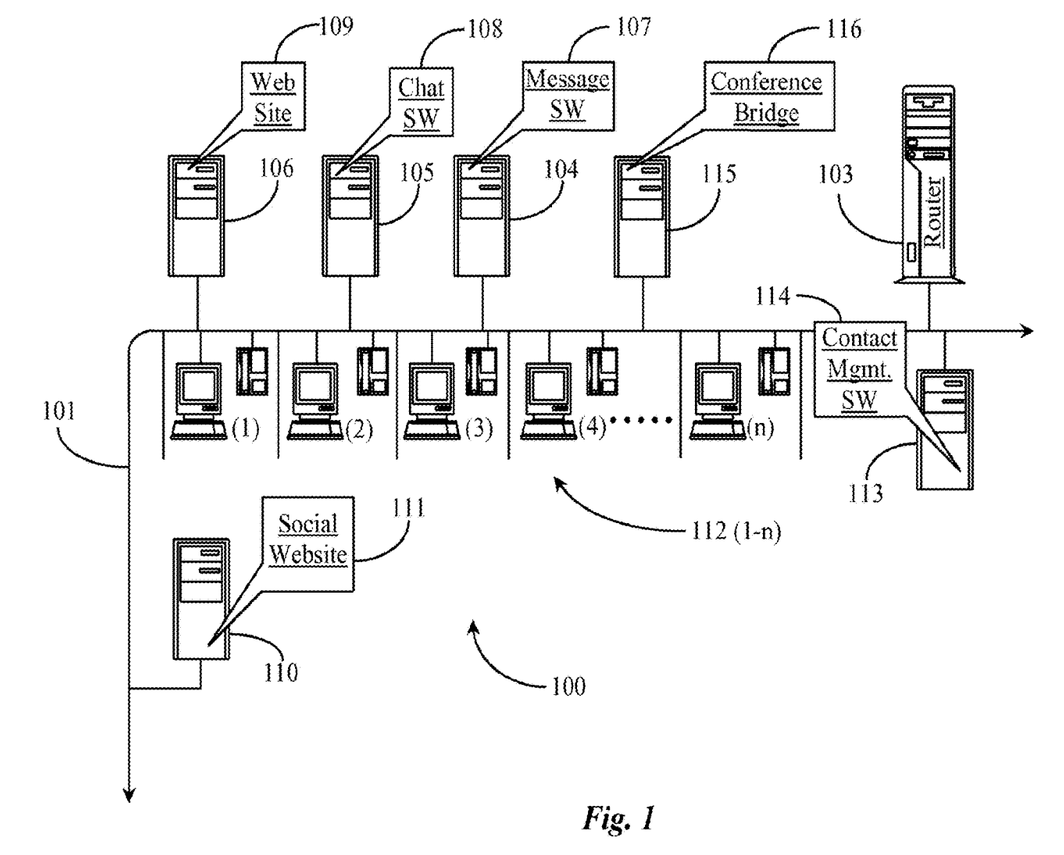
FIG. 1 is an architectural view of a data and communications network supporting group association to a single contact within a contact center according to an embodiment of the present invention.

FIG. 1 is an architectural view of a data and communications network 100 supporting group association to a single contact within a contact center according to an embodiment of the present invention. Data and communications network 100 is characterized by a network backbone 101. Network backbone 101 represents the Internet backbone including any connected sub-networks adapted for Internet protocol. Backbone 101 includes all of the lines, equipment, and access points that make up the Internet network as a whole. Therefore, there are no geographic limitations to the practice of the present invention.

Data and communications network 100 may be referred to hereafter in the specification as the Internet network, although logically illustrated in this example to include an Internet connected call center local area network (LAN). The portion of backbone 101 supporting LAN-connected nodes within the call center domain may be referred to as LAN 101. Where backbone 101 extends beyond the call center domain, it may be referred to herein as Internet 101. LAN 101 supports multiple agent workstations 112 (1-*n*) within a call center domain. Workstations 112 (1-*n*) each include a LAN-connected personal computer (PC) and a LAN-connected Internet protocol (IP) telephone for conducting voice communications. In this example, data network telephony (DNT), more specifically, Internet protocol network telephony (IPNT) is practiced. Analog or public switched telephony is not represented although it could also be practiced within the call center domain.

LAN 101 supports a Web server 106. Web server 106 includes a non-transitory physical medium adapted to contain all of the data and software required to enable function as a Web server that server Web pages created using any one of several known markup languages and supporting protocols known to and available to the inventors. Web server 106 includes a contact center Website 109. Website 109 represents an Internet access point for interacting with and communicating with call center resources including live agents operating at workstations 112 (1-*n*). Website 109 may be hosted by the call center or by a business entity represented by the call center. A third party may also host Website 109.

LAN 101 supports a chat server 105. Chat server 105 includes a non-transitory physical medium adapted to contain all of the data and software, namely chat software (SW) 108, required to enable function as a chat server. LAN 101 supports a message server 104 within the domain of the call center. Message server 104 includes a non-transitory physical medium that includes all of the data and software, namely message software (SW) 107, required to enable function as a message server. Message server 104 may be an email server or any other type of server that serves messages, notifications, or other message types.

LAN 101 supports a conference bridge server 115. Conference bridge server 115 includes a non-transitory physical medium that contains all of the data and software, namely conference bridging SW, required to enable function as a conference bridge server.

LAN 101 supports a router 103. Router 103 includes a non-transitory physical medium adapted to contain all of the data and software required to enable function as a router. Router 103 may rout IP calls, messages, internal calls, and other data over LAN 103. Interactions may arrive at router 103 from external networks for destination routing within the call center. Other equipment may be included within the domain of the call center and may be supported by LAN 101 without departing from the present invention, including but not limited to an interactive voice response unit, a voice application server, an outbound contact server, etc. Such utilities are known in call center deployment architectures and are available to the inventor.

Backbone 101 supports a publicly accessible Web server 110. Web server 110 includes a non-transitory physical medium adapted to contain all of the data and software (SW) required to enable function as a Web server. Web server 110 is hosted outside of the domain of the call center. Web server 110 hosts one or more social interaction Websites like social interaction Website 111. Website 111 may be a Facebook™ site, a Myspace™ site, a Linked-In™ site, a Google™ site, a Twitter™ site, or any other site that enables social interaction. Such sites routinely host groups of individual site members such as Facebook friends, for example. Other examples of groups include business related groups, or professional groups that may be formed on sites such as Linked-in or Google Huddle™, for example.

LAN 101 supports a contact management server 113. Contact management server 113 includes a non-transitory physical medium adapted to contain all of the data and software, namely contact management software (SW) 114, required to enable function as a contact management server. Server 113 manages individual contacts that are customers including other contacts known by the contact center. In a preferred embodiment of the present invention, SW 113 includes functions for managing a group of individuals as a single contact entity within the contact center.

SW 114 includes a function for identifying a group of individuals including identification of each group member according to any existing group rules and member profiles. In one embodiment, a group of individuals could be defined by shared attributes of members of the group. In one embodiment, a "virtual" group could be dynamically identified by shared attributes of individuals, which may imply in some embodiments, open membership depending on whether or not the common attribute(s) apply to an individual for inclusion into the group.

In one embodiment a group may or may not have named group members. In one embodiment a group is treated as a single contact entity where the names of individual members of the group are not divulged to the contact center. In a preferred embodiment, SW 114 identifies each group participant or member of a group and makes that information generally or conditionally available to contact center services including live personnel. SW 114 enables dedicated interaction management solutions tailored to interacting with a group of individuals as a single contact in ways that are different from existing interaction management functions that only treat contacts as individuals.

SW 114 may be enhanced to automatically search for established groups of individuals that might have common interests related to one or more businesses represented by the call center. For example, SW 114 may initiate an automated search or Web crawl to look for established groups that interact online. Once a promising group is identified, the SW gathers all of the identification data and any contact data attributed to individual members of the group. In one embodiment, the SW communicates to all members of the group through a commonly shared channel like a Facebook™ wall, for example. Other channels available to the group as a whole may be exploited for the purpose of posting notification to the group as a whole through any available shared channel.

There may be multiple communication channels available between the contact center and the group such as a common Website, posting board, forum, discussion board, or other Web channels. In one embodiment a group-enabled messaging channel such as Twitter™ can be used to communicate with a group. In one embodiment, chat, mass email notification, or conference calling is practiced when communicating with a group. Other examples of a group that could be treated as a single contact within a contact center are a Circle or Huddle group within Google™ There are many other examples of business-specific groups that can be set up either through a dedicated web site run by the given business represented by the contact center or by leveraging all-purpose social network infrastructures.

In one embodiment, SW 114 is enhanced for the function of dynamic assembly of a group by searching Web activities of individuals and grouping them by common activities or interests. In this way, virtual groups may be established for outbound campaigning purposes. In some cases, a dynamically assembled virtual group may be stored permanently as a single contact within the contact center.

Preferred dynamics of a group may vary widely depending on the business type marketing to the group. For example, an online sporting goods retailer may prefer a group whose members have a common attribute interpreted as a close involvement or relationship to certain sports activities. A fashion or gaming business will look for groups with unifying common attributes in those business areas.

A group may be a temporary group that assembles for an event-related trip where a certain number of seats will be occupied as evidenced by online registration, for example. In this case, the business may be a casino or even the sponsor of the trip offering relative products and or services. A group may be a temporary group assembled for a pre-defined period of time such as, for example, Ford Fiesta's program for persons applying to be one of the top agents to win a free Fiesta car for six months and documenting their experience on Lifestream™.

In addition to a wide variety of different types of groups that may be treated as a single contact within a contact center, there may be a variety of different business relationships a particular company may nurture in these groups. In one embodiment, the group is a partner in a commercial transaction. In another embodiment, a group is subject to opinion or influence mining. Still another group may be cultivated as product or service beta group, a product focus group, or subjects of targeted medical treatments such as a clinical trial enrolling hundreds of individuals whom all have online accounts. In one case a group comprises investors in specific areas of stocks or bonds or capital groups that fund businesses and require specific services like head hunting or the like.

In another embodiment, a group may be attributed special rules like a specific number of individuals requiring a specific number of individuals present (online) to trigger services, or if political, a specific presence of voting members, etc. Other rules may be created by the marketing business for certain types of established groups such as establishing a deputy policy with approval processes. A company may establish rank and weight, required presence type, and permission to delegate for the group. There may be authentication rules for voting of delegating for the group by one or a quorum of members. Contact rules may also be created for treating a group as a single contact entity like requiring certain strength relative to authentication of individuals in the group and what methods are required to prove virtual presence for performing a transaction on behalf of group members. Opt out policies may also be implemented for certain groups. Time limits may be established for marketing purposes such as a minimum time window for a quorum or group majority to have online presence before a marketing campaign is launched.

A group that is identified or dynamically assembled by SW 114 may be marketed to as a single contact where the contact information of all the group's members is also known to the contact center. The group data, individual member profiles, group or member contact information, group common attributes and other data may be stored in a database under a single contact heading. Discounts in products or services may be automatic depending on the number of individuals in a given group that are willing to engage in a transaction through the call center. Outbound campaigns targeting a group as a single contact might use Website 109, chat SW 108, message SW 107, or conference SW 116 to initiate communications with members of the group. In this way one or a few live agents may handle a group transaction or multiple transactions arising out of group communications such as an online forum or conference call. In one embodiment, a single agent may work an online group designated as a single contact by moderating a group chat session wherein those in the group that are ready to transact may be re-directed to a waiting pool of closing agents such as agents operating workstations 112 (1-*n*). There are many possibilities.

Figure 2:
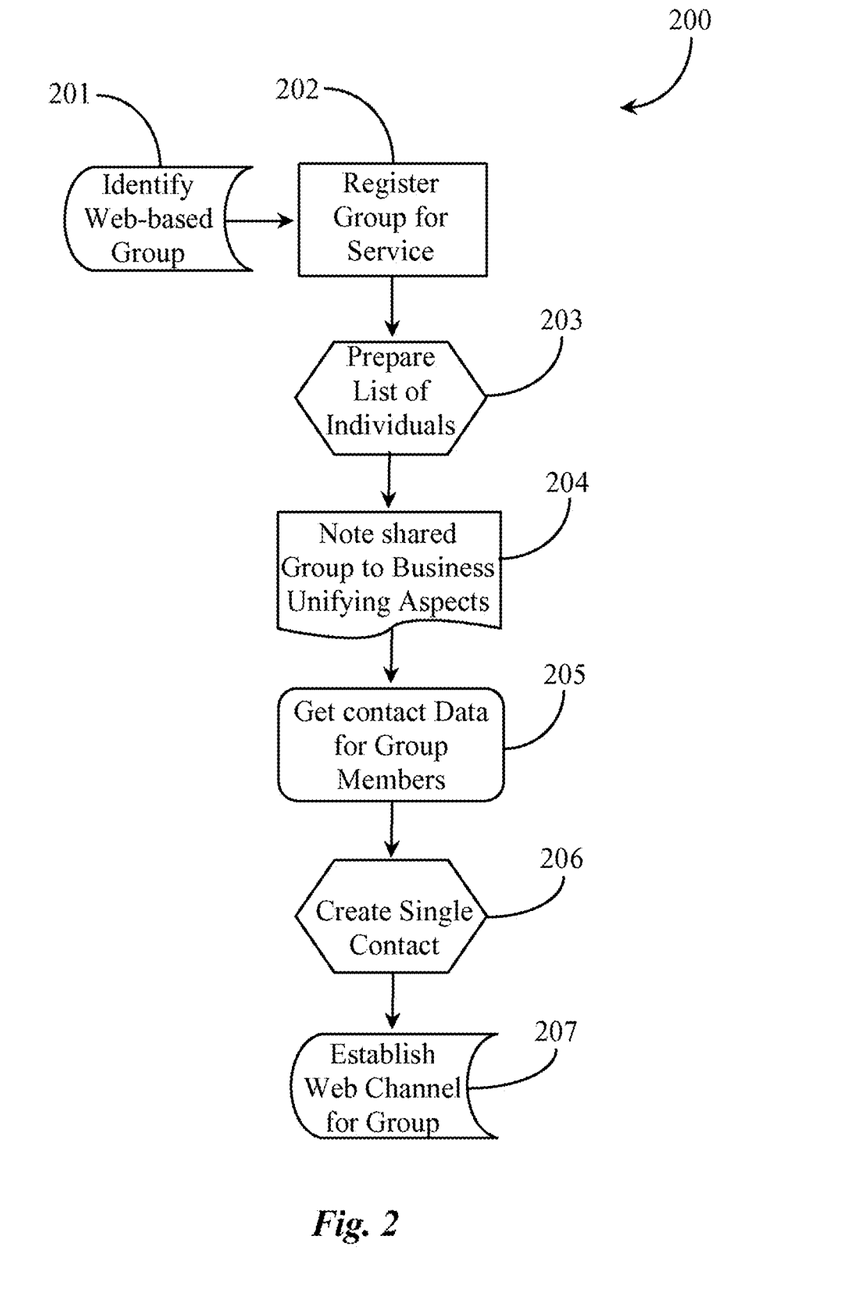
FIG. 2 is a process flow chart illustrating steps for transacting with a Web-based group according to the embodiment of FIG. 1.

FIG. 2 is a process flow chart 200 illustrating steps for transacting with a Web-based group according to an embodiment of FIG. 1. At step 201, the contact management server identifies a Web-based group that fits the business criteria for a valuable contact. At step 202, the contact management SW may invite the group to register as a special group receiving large discounts on products and services. In one aspect of the method the contact management service first finds a minimum number of individuals having like interests relative to the marketing business and then establishes a virtual group, which is then managed as a single contact.

At step 202, registration may be performed through a Website like Website 109 of FIG. 1. Registration may be performed by a delegate of the group or by each group member where some contact and profile information may be collected. At step 203, the contact management server prepares a list of all of the individuals of the group including pertinent data such as full names, profile specifics, images (if available), Website memberships, and so on. The contact management server also makes note of the shared group-to-business (G-to-B) unifying aspects relative to business goals at step 204.

At step 205, the contact management server may gather the contact information from all group members if such data was not yet available at step 203. In the case of group registration or application performed by a representative or delegates of the group, contact data may be obtained after registration process such as by posting the request on the group's public interface or posting board. In this case the persons may provide that information if they would like service and product discounts, for example.

At step 206, the contact server creates a single contact having all of the business-relevant attributes of the group, and stores the data as a single executable file. At step 207, the contact server may configure or establish one or more Web channels between the contact center and the group for communications and transaction performance. At step 205, individuals may be solicited for contact data and may provide that data over a secure group channel like a Web page or notification event. Soliciting contact data for individual members of an established group of individuals identified at step 201 may be based upon a threshold number of members of the group present and on designation of certain offers like discounted products and services. For example, a group is registered with group contact information available but the system may additionally want the individual contact information from the group members. In order to incentivize this, a greater discount of products and services may be afforded for a minimum number of members who provide the required contact information.

Process 200 is focused on establishment of existing Web-based groups as single contact entities within a contact center. In another embodiment, individuals may be identified and assigned to a virtual group based on common interest or activities.

Figure 3:
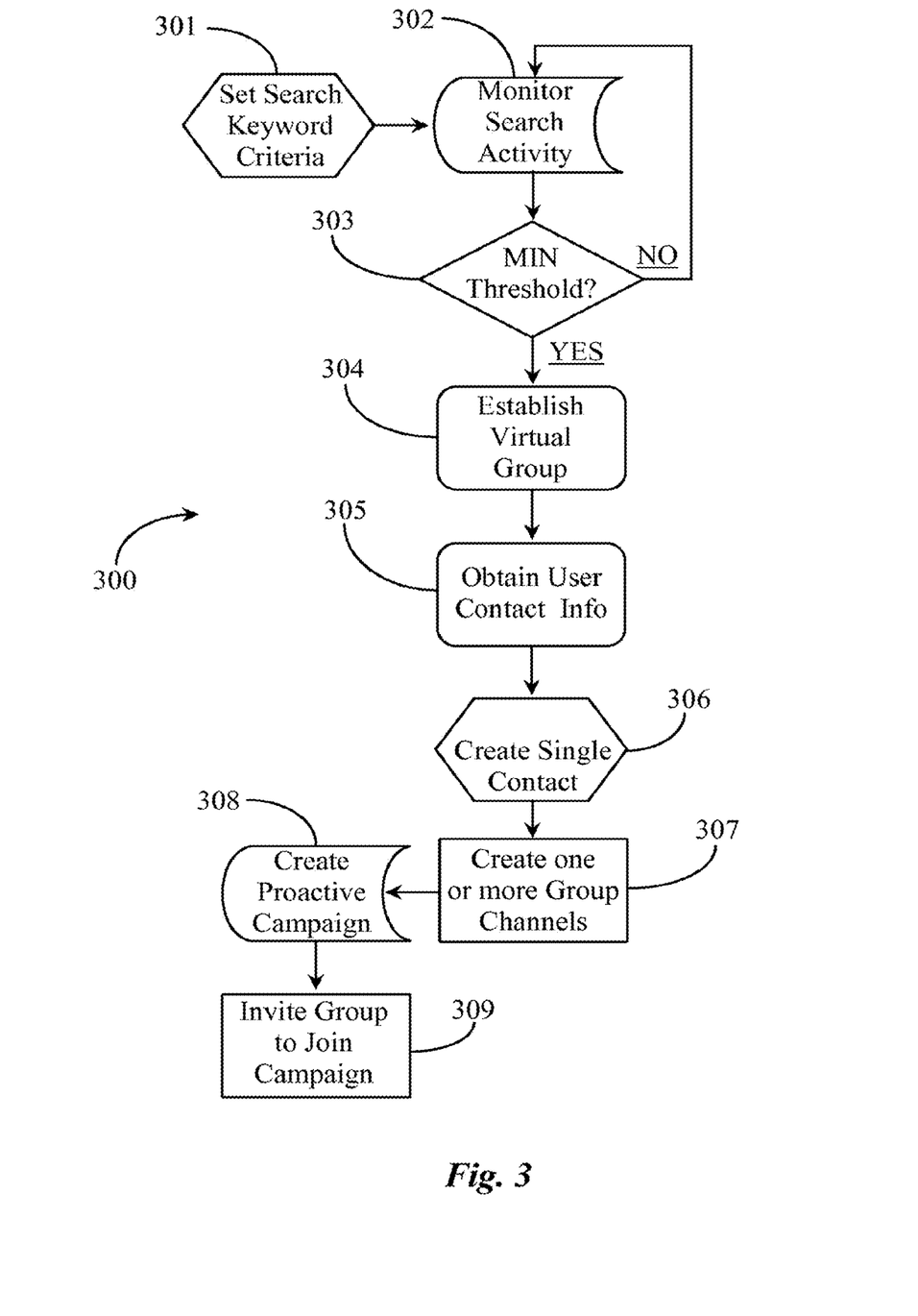
FIG. 3 is a process flow chart illustrating steps for dynamic assembly of a group into a single contact according to an embodiment of the present invention.

FIG. 3 is a process flow chart 300 illustrating steps for dynamic assembly of a group into a single contact according to an embodiment of the present invention. At step 301, the contact management server (113 of FIG. 1) with the aid of contact management software (114 of FIG. 1) sets keyword criteria for monitoring search activities at one or more established search interfaces. The search engine or engines may be hosted by the business contracting the contact center or may be search engines hosted by third party companies who have agreed to allow keyword monitoring.

The search criteria may be any keywords or phrases developed by the company that are relative to products and or services the company provides. At step 302, the contact management server monitors the search activity of persons utilizing the search engine to perform keyword or topical searches of the Internet or more segmented venues such as company Websites. When a user types one or more of the keywords or phrases set as the search monitoring criteria, that user is counted as a possible group member. At step 303, the contact management server may determine if a pre-set minimum number of users have typed in the monitored search terms into the search engine over a set period of time.

If at step 303, the determination is that the threshold was not reached, the process resolves back to step 302 for continued monitoring of search activity. If it is determined at step 3 that the minimum number of users as defined by the threshold has been met, then the contact management server establishes a virtual group of all of the members that typed the monitored search terms into the search engine. At step 305, the contact management server obtains contact information of the users of the virtual group. This may be achieved by inserting a cookie into the browser of the user at the time of the search attempt where one or all of the correct search terms were typed into the search engine.

The Website hosting the search engine may insert the cookies. The cookie may report the last known email address of the user in the virtual group the next time the user access the Internet. At the time of the search attempt, the contact management SW notes the machine addresses or IP addresses of the computing devices operated by the users used in the search and may use those data to identify the users assigned to the virtual group. After a period of time, the contact data of those users may be obtained when they next access the Internet. The cookie causes a short message to be sent to the contact center from the computing appliance used to enter the search terms into the search interface.

At step 306, the contact management server creates a single contact entity representing the virtual group. At step 307, the contact management server creates one or more group channels dedicated to interact5ing with the group. A group channel may be a forum, a discussion group, a Website that only group members may access, a conference channel, a collaboration channel, or the like.

At step 307, the contact center may create a multi-step proactive campaign in order to solicit the group members relative to products and services available to the group. At step 308, the contact management server may invite the group to join the created campaign using messaging, email, or other obtained contact information of the group members. This group and campaign may be temporary for a one-time event like a product rollout, a service discount offer, or some other promotion. Individual members of the group may become permanent customers after engagement, and may be retained in the system as single contacts. In one aspect, the customers developed from the group retain group status as long as a minimum threshold number of persons for the group is met. In this process the related keywords typed into the search engine by the users provide the basis for launching a temporary outbound contact campaign. In another embodiment, the keywords may return ads or messages inviting users to be part of a group.

Figure 4:
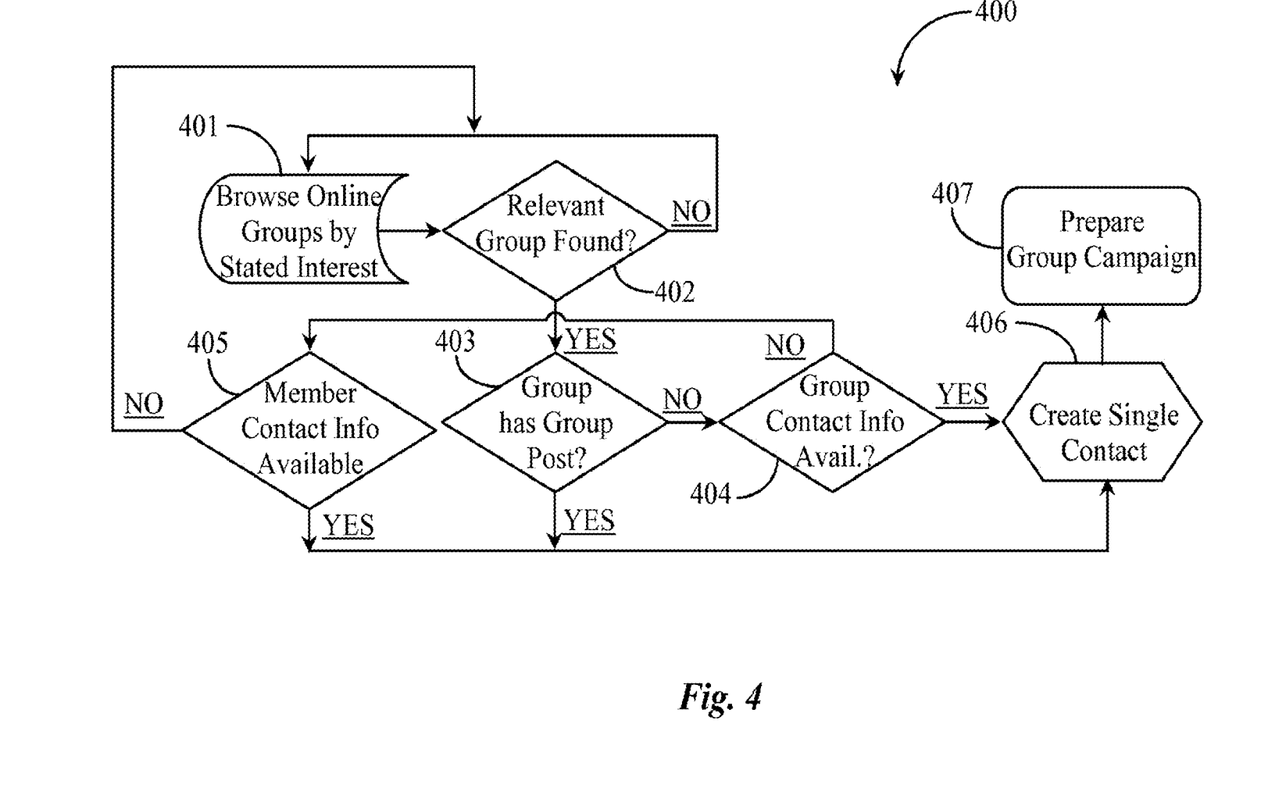
FIG. 4 is a process flow chart illustrating steps for launching a proactive campaign to a single contact representing an established group according to an embodiment of the present invention.

FIG. 4 is a process flow chart 400 illustrating steps for launching a proactive campaign to a single contact representing an established group according to an embodiment of the present invention. At step 401, the contact manager software (SW 114 FIG. 1) browses established online groups by stated interest. One or more human operators may also perform browsing established groups manually.

At step 402, it is determined if a relevant group is found. A relevant group is one where all or a significant number of members share one or more like attributes that are relevant to the business goals of the soliciting company. If no relevant group is determined at step 402, then the process resolves back to step 401 for continued browsing. If a business goal relevant group is found, it is determined at step 403 if the group has a common communications board like a posting board.

If it is determined that no common group communications site is available, it is determined at step 404 if group contact information such as a group email address or Website is available. If at step 404, no group contact information is available, then it is determined at step 405 if individual group member contact information is available. If no individual group member contact information is available at step 405, the process may resolve back to step 401 for continued browsing.

If it is determined at step 403, that the group has a common communications site such as a group posting message board, forum or posting wall, then the process may skip over to step 406 where a single contact is created representing the group. Once a contact is created at step 406, the process moves to step 407 for preparation of a proactive campaign that targets the group in some way relevant to the aligned interests of the group members and the enterprise soliciting the group. At step 404, if the group contact information is available, then the process proceeds to steps 406 and 407 accordingly. Likewise, if at step 405, member contact information is determined to be available, then the process moves to steps 406 and 407. Using dynamic virtual group assembly or established group registration as a premise for generating an outbound contact campaign may increase the likely hood of higher percentage of business conducted with fewer contact center resources expended in the process.

Figure 5:
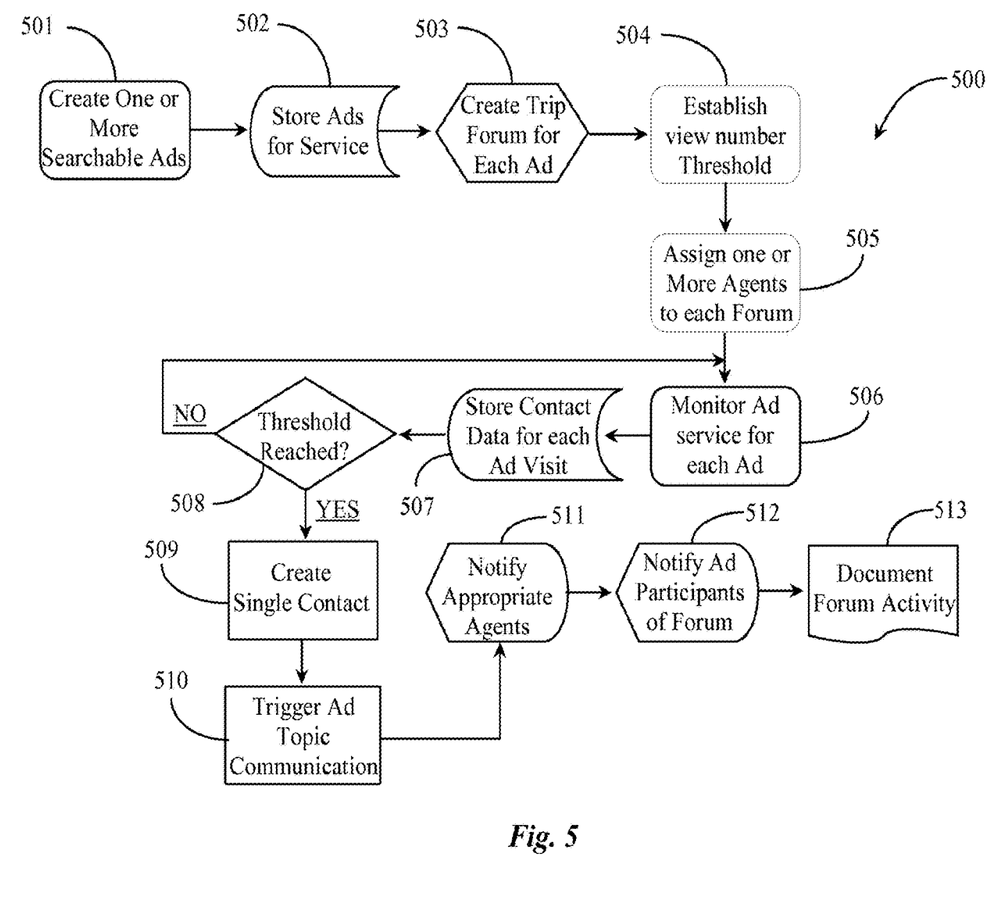
FIG. 5 is a process flow chart illustrating steps for triggering a moderated topic group communication for a single contact representing a dynamically assembled group according to an embodiment of the present invention.

FIG. 5 is a process flow chart 500 illustrating steps for triggering a moderated topic group communication for a single contact representing a dynamically assembled group according to an embodiment of the present invention. In one embodiment, ads may be placed and monitored for interaction. Ad responders may be dynamically grouped into a virtual group represented by a single contact within the contact center. Such a group may be targeted for proactive invitation from the contact center to engage in communication.

At step 501, the contact center creates one or more ads that may be searchable by keyword or phrase. At step 502, the contact center or an ad service stores the created ads for service to users interacting with returned search results featuring the ad or with a banner placement of the ad link. At step 503, the contact center creates a trip forum for each separate ad. The term trip forum refers to a moderated discussion tripped or triggered by inclusion of a minimum number of users accepting a proactive invitation to chat or discuss topics relative to the ad in more detail.

At step 504, the contact center establishes a minimum number threshold that must be met to trigger launching of the trip forum. The threshold number might be established based on predicted response to the placed ad. At step 505, the contact center assigns one or more live agents to moderate in each trip forum should they be triggered. The agents are reserved and are called away from other duties when the forum is to begin. At step 506, the contact management server may monitor ad service for each ad. The contact manager may obtain and store user contact information for each ad visit. This may be integrated into the ad, for example, listing an email address to view the entire ad as opposed to a summary ad. In one embodiment, part of the ad may be hidden or locked requiring entry of contact information to unlock the hidden portion of the ad. At step 507, the ad monitor may obtain and store contact data for each ad visit.

At step 508, it is determined if a minimum ad-view threshold has been reached. If the threshold has not been reached, the process resolves back to step 506 for continued monitoring. If the threshold has been met at step 508, then the ad-topic forum is triggered at step 509. At step 510 the agents or moderators reserved at step 505 are notified of the pending-moderated discussion. At step 511, all of the ad participants are notified of the topic forum by message notification, typically email. In one embodiment, other contact information may be used in notification if available to the system.

It will be apparent to one with skill in the art that the contact management system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A method for establishing a group as a single contact for a contact center, the method comprising:

identifying, by a processor, an ad associated with a keyword;

outputting, by the processor, the ad in response to receiving the keyword from one or more user devices;

monitoring, by the processor, responses by the one or more user devices to the output ad;

identifying, by the processor, a threshold number of the responses by the one or more user devices;

establishing, by the processor, a group based on identifying the threshold number of the responses, the group including as a group member, each user associated with a responding one or more user devices;

aggregating, by the processor, contact information of each user associated with the responding one or more user devices;

storing, by the processor, the aggregated contact information in association with the group, the group being further associated with the single contact for communicating with the group;

initiating, by the processor, communication with the group; and in response to the initiating of the communication with the group, establishing, by the processor, a communication channel to the group based on the single contact, wherein communication with the group is via the established communication channel.

2. The method of claim 1, wherein the group is a discussion forum associated with the output ad, wherein the group is moderated by a contact center agent via the established communication channel.

3. The method of claim 1, wherein the keyword includes one or more criteria relating to product, service, or skills.

4. The method of claim 1, wherein the threshold number is established based on a predicted response to the output ad.

5. The method of claim 1, wherein the group is a temporary group established for a predetermined time period.

6. The method of claim 1, wherein the aggregated contact information stored under the single contact includes telephone number, email addresses, or instant message address associated with the group.

7. The method of claim 1, wherein the single contact is at least one of a group email address or website.

8. The method of claim 1, wherein the communication channel includes a Web channel, a chat room, or a conference bridge.

9. The method of claim 1, wherein monitoring responses by the one or more user devices to the output ad includes insertion of a cookie into a browser of the user devices being monitored.

10. The method of claim 9, wherein monitoring responses by the one or more user devices to the output ad includes receiving user information from a cookie installed in the one or more user devices.

11. A system for establishing a group of individuals as a single contact a contact center, the system comprising:
   a processor; and
   a memory, wherein the memory stores instructions therein that, when executed by the processor, cause the processor to:
      identify an ad associated with a keyword;
      output the ad in response to receiving the keyword from one or more user devices;
      monitor responses by the one or more user devices to the output ad;
      identify a threshold number of the responses by the one or more user devices;
      establish a group based on identifying the threshold number of the responses, the group including as a group member, each user associated with a responding one or more user devices;
      aggregate contact information of each user associated with the responding one or more user devices;
      store the aggregated contact information in association with the group, the group being further associated with the single contact for communicating with the group;
      initiate contact to the group; and
      in response to initiating of the contact to the group, establish a communication channel to the group based on the single contact, wherein communication with the group is via the established communication channel.

12. The system of claim 11, wherein the group is a discussion forum associated with the output ad, wherein the group is moderated by a contact center agent via the established communication channel.

13. The system of claim 11, wherein the keyword includes one or more criteria relating to product, service, or skills.

14. The system of claim 11, wherein the threshold number is established based on a predicted response to the output ad.

15. The system of claim 11, wherein the group is a temporary group established for a predetermined time period.

16. The system of claim 11, wherein the aggregated contact information stored under the single contact includes telephone number, email addresses, or instant message address associated with the group.

17. The system of claim 11, wherein the single contact is at least one of a group email address or website.

18. The system of claim 11, wherein the communication channel includes a Web channel, a chat room, or a conference bridge.

19. The system of claim 11, wherein monitor responses by the one or more user devices to the output ad includes insertion of a cookie into a browser of the user devices being monitored.

20. The system of claim 19, wherein monitor responses by the one or more user devices to the output ad includes receiving user information from a cookie installed in the one or more user devices.

* * * * *